United States Patent
Joseph et al.

(10) Patent No.: US 10,425,321 B2
(45) Date of Patent: Sep. 24, 2019

(54) METHODS, SYSTEMS, AND COMPUTER READABLE MEDIA FOR TESTING TIME SENSITIVE NETWORK (TSN) ELEMENTS

(71) Applicant: Ixia, Calabasas, CA (US)

(72) Inventors: Vinod Joseph, Thousand Oaks, CA (US); Alina Crina Balan, Camarillo, CA (US); Alon Regev, Woodland Hills, CA (US); Bogdan Ţenea, Bucharest (RO)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 24 days.

(21) Appl. No.: 15/498,452

(22) Filed: Apr. 26, 2017

(65) Prior Publication Data

US 2018/0309655 A1 Oct. 25, 2018

(30) Foreign Application Priority Data

Apr. 25, 2017 (RO) .................................. 2017-00246

(51) Int. Cl.
*H04L 12/26* (2006.01)
*H04J 3/06* (2006.01)

(52) U.S. Cl.
CPC ............ *H04L 43/50* (2013.01); *H04J 3/0667* (2013.01); *H04L 43/045* (2013.01); *H04L 43/0852* (2013.01); *H04L 43/16* (2013.01)

(58) Field of Classification Search
CPC ...... H04J 3/0667; H04L 43/045; H04L 43/50; H04L 43/00

USPC ........................................................ 370/250
See application file for complete search history.

(56) References Cited

U.S. PATENT DOCUMENTS

| | | |
|---|---|---|
| 6,868,069 B2 | 3/2005 | Knobbe et al. |
| 7,092,586 B2 | 8/2006 | Vokey et al. |
| 7,272,750 B2 | 9/2007 | Sirbu |
| 7,633,939 B2 | 12/2009 | Curran-Gray et al. |
| 7,649,912 B2 | 1/2010 | Balasubramanian et al. |

(Continued)

FOREIGN PATENT DOCUMENTS

| | | |
|---|---|---|
| CN | 101447861 B | 10/2011 |
| WO | WO 2011/144263 A1 | 11/2011 |

(Continued)

OTHER PUBLICATIONS

"Time-Sensitive Networking Task," Wikipedia, the free encyclopedia, https://en.wikipedia.org/wiki/Time-Sensitive_Networking, pp. 1-7 (Aug. 29, 2017).

(Continued)

*Primary Examiner* — Robert J Lopata

(57) ABSTRACT

Methods, systems, and computer readable media for testing time sensitive network (TSN) elements are disclosed. According to one method for testing a TSN element, the method occurs at a test system. The method includes synchronizing a test system clock with a clock at a system under test (SUT). The method also includes receiving a sequence of messages, wherein the sequence of messages is generated using schedule rules associated with a TSN stream. The method further includes determining, using timing information associated with the test system clock, whether the schedule rules are accurately implemented by the SUT.

19 Claims, 10 Drawing Sheets

(56) References Cited

U.S. PATENT DOCUMENTS

| | | | |
|---|---|---|---|
| 7,881,209 B2 | 2/2011 | Beliles, Jr. et al. | |
| 8,718,482 B1 | 5/2014 | Roberts | |
| 8,767,565 B2 | 7/2014 | Dalmau et al. | |
| 9,106,353 B2 | 8/2015 | Hsueh et al. | |
| 9,130,945 B2 | 9/2015 | Smith et al. | |
| 9,288,777 B2* | 3/2016 | Hollabaugh | H04W 56/0035 |
| 9,300,565 B2 | 3/2016 | Robitaille et al. | |
| 9,380,070 B1 | 6/2016 | Cain et al. | |
| 9,614,689 B2 | 4/2017 | Cook et al. | |
| 9,686,169 B2 | 6/2017 | Formby et al. | |
| 9,699,051 B2 | 7/2017 | Rata et al. | |
| 9,736,804 B2 | 8/2017 | Regev | |
| 9,800,595 B2 | 10/2017 | Jackson | |
| 9,813,226 B2 | 11/2017 | Bergeron | |
| 9,819,553 B2 | 11/2017 | Robitaille et al. | |
| 9,923,656 B2 | 3/2018 | Tenea et al. | |
| 9,971,620 B2 | 5/2018 | Karnes | |
| 10,014,937 B1 | 7/2018 | Di Mola et al. | |
| 10,019,333 B2 | 7/2018 | Regev | |
| 10,158,441 B1 | 12/2018 | Butterworth et al. | |
| 10,181,912 B1 | 1/2019 | Callaghan et al. | |
| 2002/0093917 A1 | 7/2002 | Knobbe et al. | |
| 2003/0105976 A1 | 6/2003 | Copeland, III | |
| 2003/0200483 A1 | 10/2003 | Sutton | |
| 2004/0190547 A1 | 9/2004 | Gordy et al. | |
| 2007/0268938 A1 | 11/2007 | Dowd | |
| 2009/0207752 A1 | 8/2009 | Bugenhagen | |
| 2009/0217075 A1 | 8/2009 | Adar et al. | |
| 2009/0231191 A1 | 9/2009 | Wu et al. | |
| 2009/0257354 A1 | 10/2009 | Hannel et al. | |
| 2010/0039157 A1 | 2/2010 | Kaeriyama et al. | |
| 2010/0098111 A1 | 4/2010 | Sun et al. | |
| 2011/0170534 A1 | 7/2011 | York | |
| 2011/0199133 A1 | 8/2011 | Yamada | |
| 2011/0211473 A1 | 9/2011 | Matityahu et al. | |
| 2011/0268097 A1 | 11/2011 | Agrawala et al. | |
| 2012/0166327 A1 | 6/2012 | Amicangioli | |
| 2012/0275317 A1 | 11/2012 | Geva | |
| 2013/0064095 A1 | 3/2013 | Chew et al. | |
| 2013/0070777 A1 | 3/2013 | Hutchison et al. | |
| 2013/0080817 A1 | 3/2013 | Mihelic | |
| 2013/0086250 A1 | 4/2013 | Eskicioglu et al. | |
| 2013/0094515 A1 | 4/2013 | Gura et al. | |
| 2013/0170507 A1 | 7/2013 | Hsueh et al. | |
| 2013/0173778 A1 | 7/2013 | Hsy et al. | |
| 2013/0212439 A1 | 8/2013 | Stevens et al. | |
| 2013/0259049 A1 | 10/2013 | Mizrahi | |
| 2013/0265886 A1 | 10/2013 | Leong | |
| 2013/0278312 A1 | 10/2013 | Getzin et al. | |
| 2013/0329595 A1 | 12/2013 | Scholz | |
| 2013/0343207 A1 | 12/2013 | Cook et al. | |
| 2013/0347103 A1 | 12/2013 | Veteikis et al. | |
| 2014/0006610 A1 | 1/2014 | Formby et al. | |
| 2014/0164860 A1 | 6/2014 | Kim | |
| 2014/0185632 A1 | 7/2014 | Steiner et al. | |
| 2014/0247839 A1 | 9/2014 | Kingsley | |
| 2014/0297852 A1 | 10/2014 | Shimizu et al. | |
| 2014/0304505 A1* | 10/2014 | Dawson | G06F 21/6227 713/165 |
| 2014/0317288 A1 | 10/2014 | Krueger et al. | |
| 2014/0321285 A1 | 10/2014 | Chew et al. | |
| 2014/0344930 A1 | 11/2014 | Foley | |
| 2015/0016274 A1 | 1/2015 | Holland | |
| 2015/0023168 A1 | 1/2015 | Kotecha et al. | |
| 2015/0023170 A1 | 1/2015 | Kakadia et al. | |
| 2015/0103828 A1* | 4/2015 | Chandhoke | H04L 47/805 370/392 |
| 2015/0103832 A1* | 4/2015 | Chandhoke | H04L 49/206 370/392 |
| 2015/0103836 A1* | 4/2015 | Chandhoke | H04L 12/4666 370/401 |
| 2015/0103848 A1* | 4/2015 | Chandhoke | H04J 3/0661 370/512 |
| 2015/0245306 A1* | 8/2015 | Boehlke | H04J 3/0664 370/350 |
| 2015/0281025 A1 | 10/2015 | Wallbaum et al. | |
| 2016/0065434 A1 | 3/2016 | Janakiraman | |
| 2016/0110211 A1 | 4/2016 | Karnes | |
| 2016/0110212 A1 | 4/2016 | Karnes | |
| 2016/0285575 A1 | 9/2016 | Holmeide | |
| 2016/0301589 A1 | 10/2016 | Rata et al. | |
| 2016/0301599 A1 | 10/2016 | Porfiri et al. | |
| 2016/0306726 A1 | 10/2016 | Regev | |
| 2016/0309434 A1 | 10/2016 | Regev | |
| 2016/0315756 A1 | 10/2016 | Tenea et al. | |
| 2017/0041126 A1 | 2/2017 | Bergeron | |
| 2017/0085581 A1 | 3/2017 | Jackson | |
| 2017/0331748 A1* | 11/2017 | Mangin | H04L 47/826 |
| 2018/0041399 A1 | 2/2018 | Robitaille et al. | |
| 2018/0070373 A1* | 3/2018 | Muench | H04L 7/0033 |
| 2018/0160424 A1* | 6/2018 | Cavalcanti | H04B 7/0408 |
| 2018/0184438 A1* | 6/2018 | Cavalcanti | H04W 56/0005 |
| 2018/0191642 A1* | 7/2018 | Biederman | H04L 12/4641 |
| 2018/0227067 A1* | 8/2018 | Hu | H04J 3/0658 |
| 2018/0237039 A1* | 8/2018 | Mong | B61L 15/0081 |
| 2018/0295144 A1 | 10/2018 | Jackson | |
| 2018/0302330 A1* | 10/2018 | Bush | H04L 47/28 |
| 2018/0302331 A1* | 10/2018 | Bush | H04L 47/28 |
| 2018/0309656 A1 | 10/2018 | Regev | |

FOREIGN PATENT DOCUMENTS

| | | |
|---|---|---|
| WO | WO 2016/168063 A1 | 10/2016 |
| WO | WO 2016/168064 A1 | 10/2016 |
| WO | WO 2017/052714 A1 | 3/2017 |

OTHER PUBLICATIONS

Commonly-assigned, co-pending U.S. Appl. No. 15/647,207 for "Methods, Systems and Computer Readable Media for Testing Scheduling Fidelity in a Time Sensitive Network," (Unpublished, filed Jul. 11, 2017).

Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).

"IEEE Standard for Local and metropolitan area networks—Bridges and Bridged Networks—Amendment 29: Cyclic Queuing and Forwarding," IEEE Computer Society, IEEE Std 802.1Qch™-2017, pp. 1-28 (May 18, 2017).

"IEEE Standard for Local and metropolitan area networks—Bridges and Bridged Networks—Amendment 26: Frame Preemption," IEEE Computer Society, IEEE Std 802.1Qbu™-2016, pp. 1-51 (Jun. 30, 2016)

"IEEE Standard for Local and metropolitan area networks—Bridges and Bridged Networks—Amendment 25: Enhancements for Scheduled Traffic," IEEE Computer Society, IEEE Std 802.1Qbv™-2015, pp. 1-55 (Dec. 5, 2015).

"IEEE Standard for Local and metropolitan area networks—Bridges and Bridged Networks—Amendment 24: Path Control and Reservation," IEEE Computer Society, IEEE Std 802.1Qca™-2015, pp. 1-105 (Sep. 3, 2015).

Finn, "802.1Qav+P802.1Qbv Time-gated Shapers," Cisco System, IEEE 802 Pleanry, pp. 1-12 (Nov. 5, 2014).

Boiger, "Deterministic Ethernet—IEEE 802.1 standards for real-time process control, industrial automation, and vehicular networks," IEEE 802 Tutorial, pp. 1-72 (Nov. 12, 2012).

Boiger, "Time Aware Shaper," Deggendorf University of Applied Sciences, IEEE 802.1 Pleanry, pp. 1-12 (Sep. 2012).

"IEEE Standard for Local and metropolitan area networks—Timing and Synchronization for Time-Sensitive Applications in Bridged Local Area Networks," IEEE Computer Society, IEEE Std 802.1AS™-2011, pp. 1-274 (Mar. 30, 2011).

Commonly-assigned, co-pending U.S. Appl. No. 16/264,127 for "Methods, Systems, and Computer Readable Media for Detecting and Mitigating Effects of Timing Attacks in Time Sensitive Networks (TSNs)," (Unpublished, filed Jan. 31, 2019).

(56) References Cited

OTHER PUBLICATIONS

Commonly-assigned, co-pending U.S. Appl. No. 16/258,485 for "Active Network Tap Supporting Time Sensitive Network (TSN) Standards," (Unpublished, filed Jan. 25, 2019).
"1588v2 Sync and Delay_Req Messages Format," http://support.huawei.com/hedex/pages/EDOC1000105968300081 25/05/EDOC100010596830008125/05/resources/message/cd feature 1588v2 format-sync.html, pp. 1-2 (Downloaded Jan. 9, 2019).
Non-Final Office Action for U.S. Appl. No. 15/482,672 (dated Nov. 16, 2018).
Moussa et al., "A Detection and Mitigation Model for PTP Delay Attack in an IEC 61850 Substation", IEEE Transactions on Smart Grid, vol. 9, No. 5, pp. 3954-3965 (Sep. 2018).
Communication of the Extended European Search Report for European Patent Application Serial No. 16780481.4 (dated Sep. 6, 2018).
Communication of the Extended European Search Report for European Patent Application Serial No. 16780482.2 (dated Aug. 9, 2018).
Communication of European publication number and information on the application of Article 67(3) EPC for European Patent Application Serial No. 16849136.3 (dated Jul. 4, 2018).
Notice of Allowance and Fee(s) Due for U.S. Appl. No. 14/688,644 (dated Feb. 28, 2018).
Notice of Allowance and Fee(s) Due for U.S. Appl. No. 14/809,513 (dated Nov. 7, 2017).
Non-Final Office Action for U.S. Appl. No. 14/688,644 (dated Jul. 26, 2017).
Notice of Allowance and Fee(s) Due for U.S. Appl. No. 14/819,337 (dated Jun. 21, 2017).
Notice of Allowance and Fee(s) Due and Examiner Initiated Interview Summary for U.S. Appl. No. 14/860,630 (dated Jun. 13, 2017).
Non-Final Office Action for U.S. Appl. No. 14/809,513 (dated May 30, 2017).
Notice of Allowance and Fee(s) Due for U.S. Appl. No. 14/688,630 (dated Apr. 12, 2017).
Non-Final Office Action for U.S. Appl. No. 14/819,337 (dated Mar. 2, 2017).
Notice of Allowance and Fee(s) Due for U.S. Appl. No. 14/685,552 (dated Mar. 1, 2017).
Notice of Allowance and Fee(s) Due for U.S. Appl. No. 13/933,661 (dated Feb. 17, 2017).
Non-Final Office Action for U.S. Appl. No. 14/860,630 (dated Dec. 19, 2016).
Non-Final Office Action for U.S. Appl. No. 14/685,552 (dated Oct. 20, 2016).
Non-Final Office Action for U.S. Appl. No. 14/688,630 (dated Oct. 17, 2016).
Non-Final Office Action for U.S. Appl. No. 13/933,661 (dated Sep. 27, 2016).
Notification of Transmittal of the International Search Report and the Written Opinion of the International Searching Authority, or the Declaration for International Application No. PCT/US2016/040532 (dated Sep. 12, 2016).
Notification of Transmittal of the International Search Report and the Written Opinion of the International Searching Authority, or the Declaration for International Application No. PCT/US2016/026534 (dated Jul. 8, 2016).
Notification of Transmittal of the International Searh report and the Written Opinion of the International Searching Authority, or the Declaration for International Application No. PCT/US2016/026533 (dated Jul. 8, 2016).
Final Office Action for U.S. Appl. No. 13/933,661 (dated Apr. 12, 2016).
Non-Final Office Action for U.S. Appl. No. 13/933,661 (dated Dec. 14, 2015).
"External Bypass Switches," Ixia, White Paper, 915-6688-01 Rev. B, pp. 1-5 (Dec. 2015).
"Network Time Protocol," Wikipedia, https://en.wikipedia.org/wiki/Network_Time_ Protocol, pp. 1-7 (Jul. 3, 2015).
"High Density Modular Fiber Tap," Ixia, http://www.ixiacom.com/products/net-optics-flex-tap, pp. 1-4 (Jul. 2014).
Watt et al., "Understanding and Applying Precision Time Protocol," Power and Energy Automation Conference, pp. 1-7 (Mar. 2014).
"Ixia Anue 3500—Mobile Backhaul Testing Solution," Ixia Data Sheet, pp. 1-5 (Dec. 2013).
Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).
"AN-1838 IEEE 1588 Boundary Clock and Transparent Clock Implementation Using the DP83640," Application Report, Texas Instruments, pp. 1-9 (Apr. 2013).
"AN-1728 IEEE 1588 Precision Time Protocol Time Synchronization Performance," Application Report, SNLA098A, Texas Instruments, pp. 1-10 (Apr. 2013).
Spirent, "Precision Time Protocol (PTP) IEEE 1588," YouTube "alantalkstech", https://www.youtube.com/watch?v=yw-gd01aOYg, pp. 1-11 (Dec. 7, 2011).
"IEEE Standard for Local and metropolitan area networks—Timing and Synchronization for Time-Sensitive Applications in Bridged Local Area Networks," IEEE Computer Society, IEEE Std 802.1ASTM-2011, pp. 1-274 (Mar. 30, 2011).
Ullmann et al., "Delay Attacks—Implication on NTP and PTP Time Synchronization", ISPCS 2009 International IEEE Symposium on Precision Clock Synchronization for Measurement, Control, and Communication, pp. 1-6 (Oct. 12-16, 2009).
"Precision Clock Synchronization The Standard IEEE 1588", Hirschmann, White Paper, pp. 1-20. (Feb. 2009).
Eidson, "IEEE-1588 Standard for a Precision Clock Synchronization Protocol for Networked Measurement and Control Systems—A Tutorial," Agilent Technologies, pp. 1-94 (Oct. 2005).
"IEEE 1588 Precise Time Protocol: The New Standard in Time Synchronization" Microsemi Power Matters, White Paper, pp. 1-10 (Copyright 2005-2017).
Final Office Action for U.S. Appl. No. 15/482,672 (dated April 2, 2019).
Communication of the extended European search report for European Patent Application Serial No. 16849136.3 (dated Feb. 20, 2019).
Bhunia et al., "Hardware Trojan Attacks: Threat Analysis and Countermeasures," Proceedings of the IEEE, vol. 102, No. 8, pp. 1-20 (Aug. 2014).
Non-Final Office Action for U.S. Appl. No. 15/482,672 (dated Jun. 14, 2019).
Communications under Rule 71(3) EPC for European Patent Application Serial No. 16 780 481.4 (dated May 7, 2019).
Commonly-assigned, co-pending U.S. Appl. No. 16/415,790 for "Indirect Testing Using Impairment Rules," (Unpublished, filed May 17, 2019).
Non-Final Office Action for U.S. Appl. No. 15/647,207 (dated May 15, 2019).
"Principles of Chaos Engineering", https://principlesofchaos.org/, pp.1-2 (May 2018).
"Time-Sensitive Networking," Wikipedia, the free encyclopedia, https://en.wikipedia.org/wiki/Time-Sensitive_Networking, pp.1-7 (Aug. 29, 2017).

\* cited by examiner

700

METHODS, SYSTEMS, AND COMPUTER READABLE MEDIA FOR TESTING TIME SENSITIVE NETWORK (TSN) ELEMENTS

PRIORITY CLAIM

This application claims the benefit of Romanian Patent Application No. a 00246 2017, filed Apr. 25, 2017; the disclosure of which is incorporated herein by reference in its entirety.

TECHNICAL FIELD

The subject matter described herein relates to testing network elements. More specifically, the subject matter relates to methods, systems, and computer readable media for testing time sensitive network (TSN) elements.

BACKGROUND

Time sensitive networks can be generally defined as networks that may communicate at least some time sensitive data. As such, time sensitive networks need to be capable of communicating time sensitive data within an acceptable amount of time. While many of today's communications networks follow a best-effort approach (e.g., various Ethernet and Internet protocol (IP) based networks), a best-effort approach is generally not suitable for time sensitive applications because even minor delays in the transmission and/or delivery of time sensitive content (e.g., data between components in a vehicle control network) is unacceptable for such applications.

To overcome the drawbacks of communications networks that use a best-effort approach, various TSN related technologies and standards have emerged. For example, the IEEE 802.1 Time-Sensitive Networking Task Group is currently in the process of specifying a set of protocols for TSNs. These protocols may provide, require, or promote behaviors for limiting and/or controlling communication related latency in TSNs. Example behaviors for TSNs may include precise synchronization between all TSN elements (e.g., devices), traffic shaping or scheduling for time sensitive streams, reservation or "admission control" for reserving or pre-allocating bandwidth and frequency for transmitting or receiving time sensitive streams, and/or identification of non-participating (e.g., "non-TSN") elements within a TSN.

Issues arise when attempting to test resources within a TSN. For example, challenges exist in testing whether a TSN element and/or related components are implementing appropriate functionality and/or are implementing standards and/or protocols accurately. Currently, there are no efficient systems and/or methods for testing TSN elements.

SUMMARY

Methods, systems, and computer readable media for testing time sensitive network (TSN) elements are disclosed. According to one method for testing a TSN element, the method occurs at a test system. The method Includes synchronizing a test system clock with a clock at a system under test (SUT). The method also includes receiving a sequence of messages, wherein the sequence of messages is generated using schedule rules associated with a TSN stream. The method further includes determining, using timing information associated with the test system clock, whether the schedule rules are accurately implemented by the SUT.

According to one system for testing a TSN element, the test system comprises at least one processor. The test system is configured for: synchronizing a test system clock with a clock at a SUT; receiving a sequence of test messages, wherein the sequence of messages is generated using schedule rules associated with a TSN stream; and determining, using timing information associated with the test system clock, whether the schedule rules are accurately implemented by the SUT.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

Figure 1:
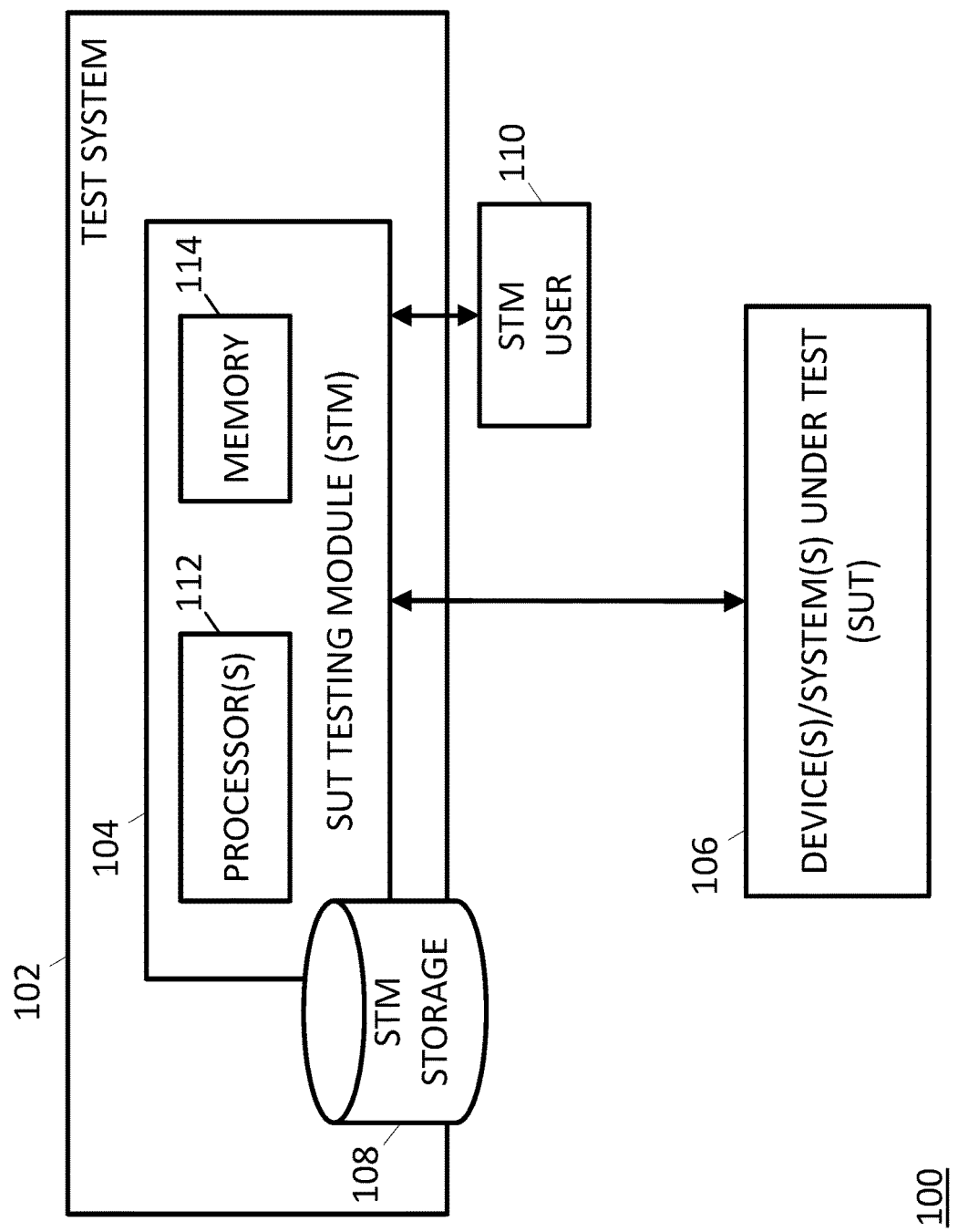
FIG. 1 is a diagram illustrating an example test environment for testing a TSN element.

The subject matter described herein relates to methods, systems, and computer readable media for testing time sensitive network (TSN) elements. A TSN may involve various TSN nodes or elements (e.g., relays and end stations) that have clocks with synchronized time. For example, a TSN and/or nodes therein may use various time synchronization mechanisms, e.g., a time synchronization protocol, such as an IEEE gPTP or IEEE PTP based protocol. Transmitting TSN elements (e.g., relays and talkers) may be aware of when they are scheduled to transmit. For example, each transmitting TSN element may utilize a time aware shaper (TAS) and/or one or more TSN schedules (e.g., gate access lists and/or stream transmit schedules) for one or more TSN streams. In this example, a gate access list may indicate when a gate or transmission window (e.g., one or more switch ports) is opened or closed for particular traffic (e.g., one or more streams) to be transmitted and a stream transmit schedule may indicate when specific stream messages or packets are to be transmitted or received. During a transmission window for scheduled messages, other message queues or streams may be blocked such that the scheduled messages can be sent without delays caused by interfering traffic.

Schedule rules and/or a related schedule may be used for minimizing latency in a TSN by providing transmission windows for TSN elements (e.g., talkers and/or relays) to send and/or receive messages. For example, schedule rules and/or a related schedule may result in non-scheduled traffic being blocked such that a port or related transmission medium is idle when scheduled traffic is to be transmitted. It will be appreciated that schedule rules and/or a TSN schedule are more effective when TSN elements or their related clocks are synchronized so as to minimize the effects of interfering traffic. However, issues can arise if schedule rules are not followed correctly or uniformly among the various TSN elements because interfering traffic may occur.

In accordance with some aspects of the subject matter described herein, techniques, methods, equipment, systems, and/or mechanisms are disclosed for testing time synchronization among TSN elements. For example, a test system may be configured for testing time synchronization of one or more clocks by measuring a maximum time error. In this example, determining the maximum time error may involve comparing a time reported by a system under test to a time known by a reference (e.g., a master clock or a test system clock).

In accordance with some aspects of the subject matter described herein, techniques, methods, equipment, systems, and/or mechanisms are disclosed for testing a TSN element. For example, a test system may be configured for testing schedule rules or a TSN schedule implemented by a TSN element. In this example, to test the TSN element or aspects thereof, the test system may synchronize a test system clock with a clock at a SUT using a time synchronization protocol or other synchronization mechanism, receive a sequence of messages, wherein the sequence of messages is generated using schedule rules, and determine, using timing information associated with the test system clock, whether the schedule rules are accurately implemented by the SUT.

In accordance with some aspects of the subject matter described herein, techniques, methods, equipment, systems, and/or mechanisms are disclosed for testing conformance and/or interoperability of a TSN element. For example, conformance testing may involve the process of testing a particular implementation of a TSN standard against a predetermined and standardized test specification, where the standardized test specification may try to cover as much of the testable statements in the standard, assuring a better interoperability of tested devices. In this example, a test system may be configured for testing a particular implementation of a TSN standard by sending test messages to a SUT and/or receiving test messages from the SUT. Continuing with this example, the test system may analyze observed behavior of the SUT and compare it with expected behavior based on the standardized test specification or related data.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test environment 100 for testing a TSN element. Referring to FIG. 1, test environment 100 may include test system 102 and one or more device(s) and/or system(s) under test (SUT) 106. Test system 102 may represent any suitable entity or entities (e.g., one or more computing platforms, nodes, or devices) associated with testing SUT 106 (e.g., one or more TSN elements). For example, test system 102 may generate and send traffic to SUT 106 and/or receive traffic from SUT 106 and may analyze one or more aspects associated with SUT 106.

In some embodiments, test system 102 may be a standalone tool, a testing device, or software executing on one or more processor(s) 112. In some embodiments, test system 102 may be a single device or node or may be distributed across multiple devices or nodes. In some embodiments, test system 102 may include one or more modules for performing various test related functions. For example, test system 102 may include a TSN element emulation module for emulating one or more TSN nodes or devices that communicates with SUT 106.

Test system 102 may include processor(s) 112, a memory 114, and a SUT testing module (STM) 104. Processor(s) 112 may represent or include a physical processor, a general purpose microprocessor, a single-core processor, a multi-core processor, a field-programmable gateway array (FPGA), and/or an application-specific integrated circuit (ASIC) for executing software and/or logic stored in memory 114. Memory 114 may represent one or more computer readable media for storing data, logic, or other information.

STM 104 may be any suitable entity or entities (e.g., software executing on a processor, an ASIC, an FPGA, or a combination of software, an ASIC, or an FPGA) for performing one or more aspects associated with testing SUT 106 and/or various aspects thereof. In some embodiments, STM 104 may be implemented using processor(s) 112 and/or memory 114. For example, STM 104 may utilize processor(s) 112 (e.g., using software stored in memory 114) to generate test messages for a number of message streams (e.g., flows or sessions). In this example, STM 104 may also utilize processor(s) 112 to perform various tests and/or analyses involving test messages and/or related responses from SUT 106.

In some embodiments, STM 104 may include one or more communications interfaces, e.g., one or more network interface cards (NICs), for interacting with users, modules, and/or nodes. For example, STM 104 may use one or more communications interfaces for receiving various messages and one or more communications interfaces sending various messages. Example messages include IP messages, Ethernet frames, Ethernet messages, PDUs, datagrams, UDP messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other TSN related messages.

In some embodiments, STM 104 may include or provide a communications interface for communicating with STM user 110. STM user 110 may be any entity (e.g., an automated system or a device or system controlled or controllable by a human user) for selecting and/or configuring various aspects associated with testing and/or generating testing related metrics. For example, various user interfaces (e.g., an application user interface (API) and a graphical user interface (GUI)) may be provided for providing configuration information, such as tests to be performed, issues to be analyzed, impairments to be generated, types of metrics or statistics to be generated, a number of test messages per port or stream to be generated, and/or other settings.

In some embodiments, STM 104 may include one or more communications interfaces for interacting with SUT 106. For example, STM 104 or another entity may be configured to send or receive test messages to or from one or more ports (e.g., ports 1, 2, and/or 3) associated with SUT 106. SUT 106 may be any suitable entity or entities (e.g., devices, systems, or platforms) for communicating with test system 102 and/or receiving, processing, forwarding and/or sending one or more messages. For example, SUT 106 may include at least TSN element that can communicate time sensitive data or related messages. In another example, SUT 106 may include one or more systems and/or computing platforms, e.g., a group of servers and/or routers. In yet another example, SUT 106 may include one or more networks or related components, e.g., a TSN or portion thereof.

In some embodiments, TSN elements that may be tested by test system 102 or STM 104 may include a network relay, a time synchronization protocol relay, a network router, a network switch, a network device, a server, or a network controller.

In some embodiments, one or more user interfaces for testing SUT 106 and/or for providing configuration information may support automation e.g., via one or more programming languages (e.g., python, PHP, etc.), a representation state transfer (REST) API, a command line, and/or a web based GUI. For example, STM user 110 may use a web browser to interact with a web based GUI for programming or configuring one or more aspects for testing SUT 106.

In some embodiments, STM 104 may include functionality for accessing STM storage 108 or memory 114. STM storage 108 may be any suitable entity or entities (e.g., a storage device, memory 114, a non-transitory computer readable medium, or a storage system) for maintaining or storing information related to testing. For example, STM storage 108 may store message capture related information, e.g., time delta information, timestamp related data, and/or other information. In this example, message capture related information may be usable to determine, derive, or compute one or more test related statistics.

In some embodiments, STM storage 108 may also contain information usable for generating statistics and/or metrics associated with one or more aspects of SUT 106. For example, STM storage 108 may contain metrics associated with one or more performance aspects of SUT 106 during one or more test scenarios. In this example, STM storage 108 may maintain a particular set of computed metrics for a first test or message stream and may maintain another set of computed metrics for a second test or a different message stream. In some embodiments, STM storage 108 and/or memory 114 may be located at test system 102, another node, or distributed across multiple platforms or devices.

In some embodiments, test system 102, STM 104, or another module may be configured for testing various aspects associated with the TSN standards being proposed by the IEEE 802.1 Time-Sensitive Networking Task Group. For example, test system 102, STM 104, or another module may be configured for testing whether SUT 106 is in compliance with or properly implements various aspects of IEEE standard 802.1Qav-2009, IEEE standard 802.1Qbv-2015, IEEE standard 802.1AS-Rev, IEEE standard 802.1Qbu-2016, IEEE standard 802.1CB, IEEE standard 802.1Qcc, IEEE standard 802.1Qca-2015, IEEE standard 802.1Qch, IEEE standard 802.1Qci-2017, IEEE standard 802.1Qcj, IEEE standard 802.1Qcp, IEEE standard 802.1Qcr, and/or IEEE standard 802.1CM. The above standards or sub-standards that are publicly available (e.g., IEEE standard 802.1Qav-2009, IEEE standard 802.1Qbv-2015, IEEE standard 802.1Qbu-2015, IEEE standard 802.1Qca-2015, and IEEE standard 802.1Qci-2017) are incorporated herein by reference in their entireties.

Some example testing performable by test system 102, STM 104, or another module may include testing redundancy in a time synchronization protocol (e.g., PTP) profile gateway, testing timing in a time synchronization protocol profile gateway, testing a reservation protocol (e.g., a multiple stream reservation protocol (MSRP) or a stream reservation protocol (SRP)) flow, testing reservation protocol scalability of a control plane, testing a talker, analyzing bandwidth guarantees, analyzing latency (e.g., using normal minimum, maximum, and/or average latency measurements or histograms), analyzing a scheduler related to testing a talker, testing a relay, analyzing a scheduler related to testing a relay, testing a hot-standby grandmaster or master clock, testing a non-TSN element to an TSN gateway, testing frame replication and elimination, testing seamless redundancy for switches and endpoints, testing gate accuracy, testing TSN schedule fidelity, testing admission control of a TSN element, testing discard policy for improperly sized messages, testing interactions with a credit based shaper or other shaper (e.g., non-TAS shaper), testing live configuration changes in a TAS, and/or testing configuration updates.

It will be appreciated that FIG. 1 is for illustrative purposes and that various nodes and/or modules, locations, and/or functionality described above in relation to FIG. 1 may be changed, altered, added, or removed.

Figure 2:
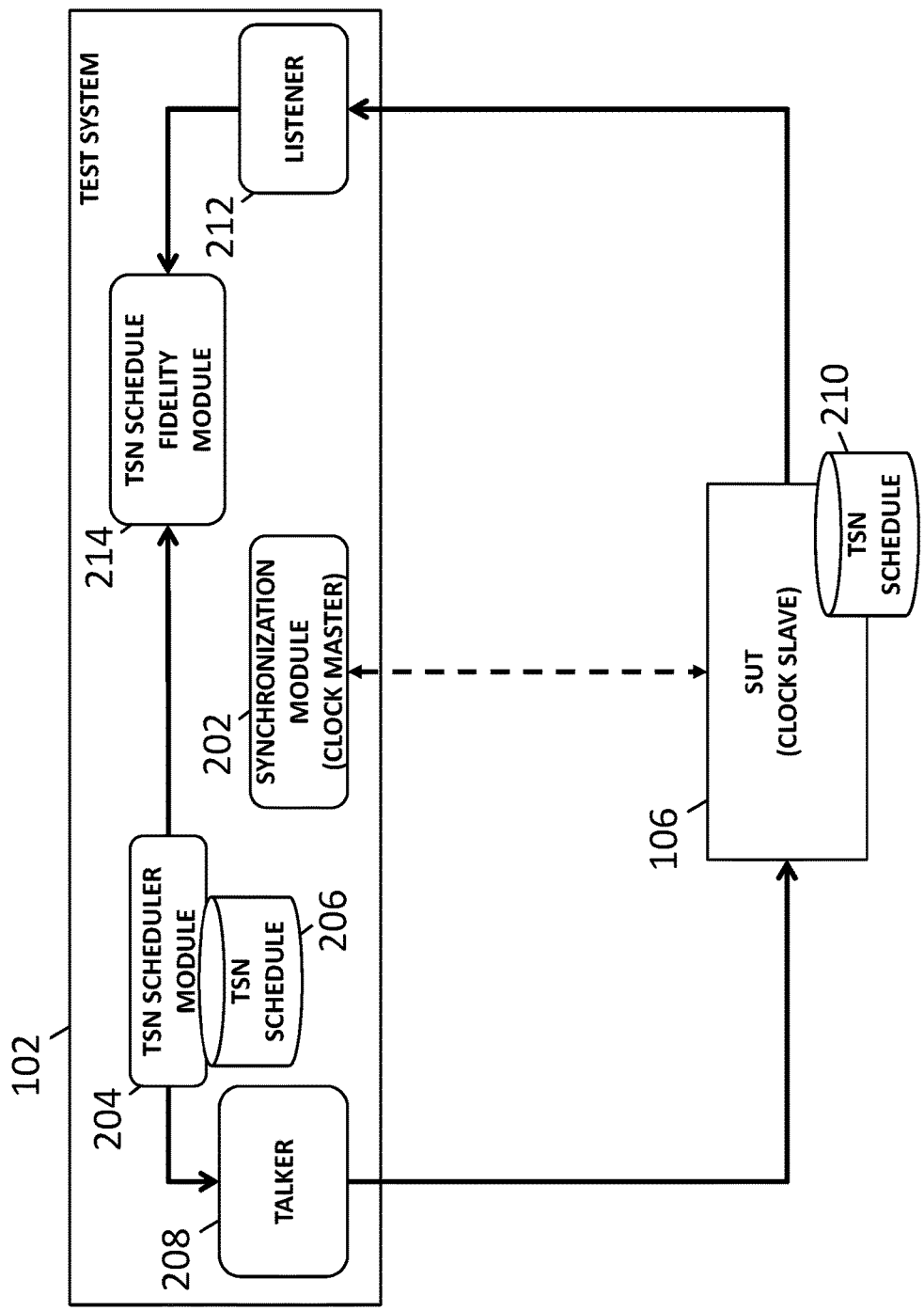
FIG. 2 is a diagram illustrating an example test system that uses an internal master clock for time synchronization.

FIG. 2 is a diagram illustrating an example test system 102 that uses an internal master clock for time synchronization. In some embodiments, test system 102 and/or functionality therein may be distributed among one or more modules, devices, or computing platforms.

Referring to FIG. 2, a depicted test environment 200 may include test system 102, SUT 106, and a TSN schedule 210 implemented thereon. As depicted, test system 102 may include a synchronization module 202, a TSN scheduler module 204, a TSN schedule 206, a talker 208, a listener 212, and a TSN schedule fidelity module 214. Synchronization module 202 may represent any suitable entity (e.g., software executing on at least one processor) for performing various aspects associated with clock synchronization. For example, synchronization module 202 may implement and use a time synchronization protocol (e.g., gPTP or some other PTP profile) for managing clock synchronization for test system 102.

In some embodiments, synchronization module 202 may include, utilize, or access a test system clock. The test system clock may be any suitable entity (e.g., a hardware-based clock or a software-based clock) for generating an indication of time and/or for maintaining time.

In some embodiments, synchronization module 202 or a related module in test system 102 may act as a master clock (e.g., a gPTP or PTP grandmaster clock) for time synchronization purposes and SUT 106 may receive time synchronization data from test system 102, e.g., for synchronizing its own clock with the test system clock.

TSN scheduler module 204 may represent any suitable entity (e.g., software executing on at least one processor) for performing aspects associated with TAS and/or message scheduling. For example, TSN scheduler module 204 may determine a TSN schedule (e.g., a message transmit schedule and/or a gate access list) across one or more test iterations. In some embodiments, TSN scheduler module 204 may determine a TSN schedule 206 for one or more message queues or streams. For example, each message queue or stream may be associated with a transmission gate that is either open or closed. In this example, a message (e.g., frame or packet) transmission from a message queue may only occur if the gate is open and the full message can be transmitted before the gate closes. Continuing with this example, TSN schedule 206 generated by TSN scheduler module 204 may include a start time (e.g., an operation base time) and a time to repeat (e.g., an operation cycle time).

In some embodiments, TSN schedule 206 may include or involve a gate access list that includes an ordered list of gate operations. For example, a gate access list may include multiple entries, where each entry may include transmission gate settings of each message queue (e.g., a gate state value) and a time to delay before executing the next list entry (e.g., a time interval value).

In some embodiments, TSN schedule 206 may be in compliance with or based on IEEE Standard 802.1Qbv-2015. For example, TSN schedule 206 may include TAS related information, e.g., a gate access list and/or other information for indicating when a gate or transmission is open or closed.

In some embodiments (e.g., when implementing TSN schedule 206 or a related gate access list), at the start of each cycle, the first entry on the list may executed and then, after a specified time to delay, the next entry may be executed. In some embodiments, entries may be executed in this manner until the last entry is executed. Once the final entry is executed, no gate changes may be performed until the next cycle starts. An example gate access list for two queues (e.g., gates 1 and 2) is depicted in Table 1.

TABLE 1

| GATE STATE VALUE | TIME INTERVAL VALUE |
|---|---|
| {1, OPEN} {2, CLOSED} | 10,000 ns |
| {1, CLOSED} {2, OPEN} | 15,000 ns |
| {1, OPEN} {2, CLOSED} | 5,000 ns |

Talker 208 may represent any suitable entity (e.g., one or more network interface cards (NICs) or communications modules) for transmitting messages (e.g., frames or message sequences) to SUT 106 or other entities. In some embodiments, talker 208 may include or represent one or more ports for sending traffic to SUT 106 and/or other entities. For example, talker 208 may transmit test messages via one or more ports from one or more related message queues. In this example, the transmitted test messages may be sent to one or more particular ports at SUT 106.

In some embodiments, talker 208 or another module may send or share TSN schedule 206 with SUT 106. For example, after determining TSN schedule 206 but prior to testing SUT 106, TSN scheduler module 204 may trigger talker 208 to send TSN schedule 206 or TSN schedule 210 to SUT 106 via one or more talker related ports. In another example, TSN schedule 206 or a TSN schedule 210 may be sent to SUT 106 using various mechanisms, e.g., via different ports (e.g., a TSN or non-TSN port), protocols (e.g., IP, HTTP, TCP, or UDP), and/or entities. In some embodiments, after receiving TSN schedule 206 or TSN schedule 210, SUT 106 may store TSN schedule 206 or TSN schedule 210 and use it, e.g., during testing, to schedule and/or perform message transmissions.

Listener 212 may represent any suitable entity (e.g., one or more NICs or communications modules) for receiving messages (e.g., frames or messages) from SUT 106 or other entities. In some embodiments, listener 212 may include or represent one or more ports for receiving traffic from SUT 106 and/or other entities. For example, listener 212 may receive test messages from SUT 106. In some embodiments, listener 212 may include functionality for identifying related test messages. For example, listener 212 may analyze message parameters, such as source media access control (MAC) address and a destination MAC address, for determining stream identifiers associated with received messages. In this example, the stream identifiers may be for identifying particular message streams and usable for distinguishing traffic for per stream analyses.

TSN schedule fidelity module 214 may represent any suitable entity (e.g., software executing on at least one processor) for determining how faithfully or accurately SUT 106 has implemented TSN schedule 210 or related schedule rules. For example, TSN schedule fidelity module 214 may analyze captured traffic and, based on TSN schedule 206 and/or using timing information of received messages, determine how accurately SUT 106 has implemented TSN schedule 210. In this example, TSN schedule fidelity module 214 may be capable of performing analysis per message stream and/or per test iteration.

In some embodiments, TSN schedule fidelity module 214 or another module may test gate accuracy. For example, SUT 106 may be configured with schedule rules that require messages to begin transmitting after a transmissions gate opens but require that no portion of a message be transmitted after the gate closes. In this example, to test implementation of gate accuracy, SUT 106 may be configured with TSN schedule 210, talker 208 may transmit traffic for different queues from different ports, and listener 212 and/or another module may validate that schedule rules of TSN schedule 210 regarding gate accuracy are met (e.g., a transmission overrun statistic remains zero over the test iteration).

It will be appreciated that FIG. 2 is for illustrative purposes and that various nodes and/or modules, locations, and/or functionality described above in relation to FIG. 2 may be changed, altered, added, or removed. It will be appreciated that talker 208 may also receive at least some traffic and that listener 212 may also send at least some traffic and that such nomenclature is for convenience and not for indicating limitations of talker 208 or listener 212.

Figure 3:
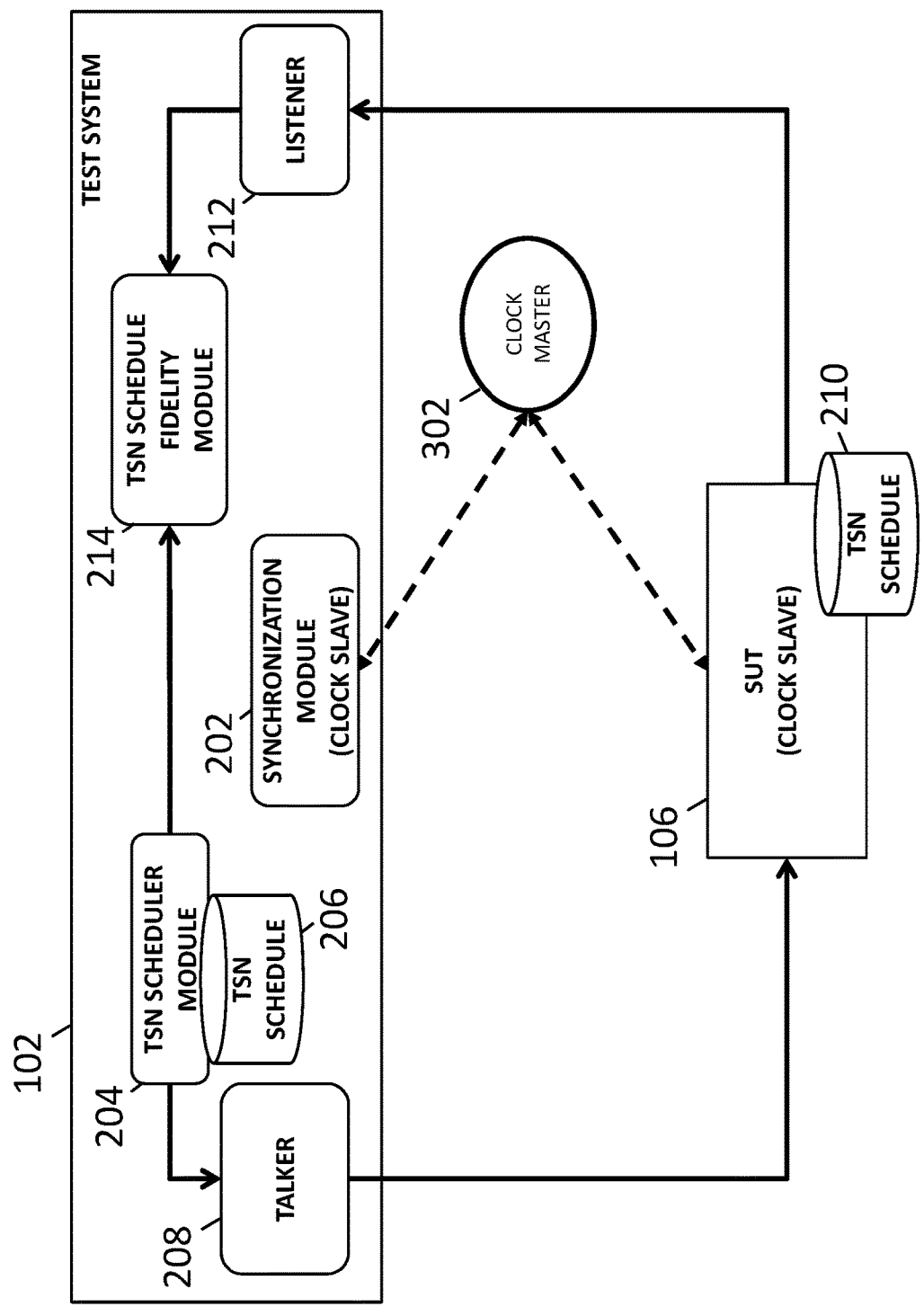
FIG. 3 is a diagram illustrating an example test system that uses an external master clock for time synchronization.

FIG. 3 is a diagram illustrating an example test system 102 that uses an external master clock 302 for time synchronization. Unless stated otherwise, test system 102 and related modules or entities depicted in FIG. 3 may include similar functionality as described in regard to FIG. 2.

Referring to FIG. 3, a depicted test environment 300 may involve testing SUT 106 using external master clock 302.

Master clock 302 may represent any suitable entity (e.g., software, hardware, and/or firmware) for generating an indication of time and/or for maintaining time. Master clock 302 may be independent and/or separate from test system 102 and may be configured to provide time synchronization messages to various entities, e.g., slave clocks, for time synchronization purposes. In some embodiments, master clock 302 may be a gPTP or PTP grandmaster clock or include similar functionality.

In some embodiments, synchronization module 202 or another module in test system 102 may act as a slave clock (e.g., a gPTP slave clock) for time synchronization purposes. In such embodiments, test system 102 and SUT 106 may receive time synchronization data from external master clock 302.

It will be appreciated that FIG. 3 is for illustrative purposes and that various nodes and/or modules, locations, and/or functionality described above in relation to FIG. 3 may be changed, altered, added, or removed.

Figure 4:
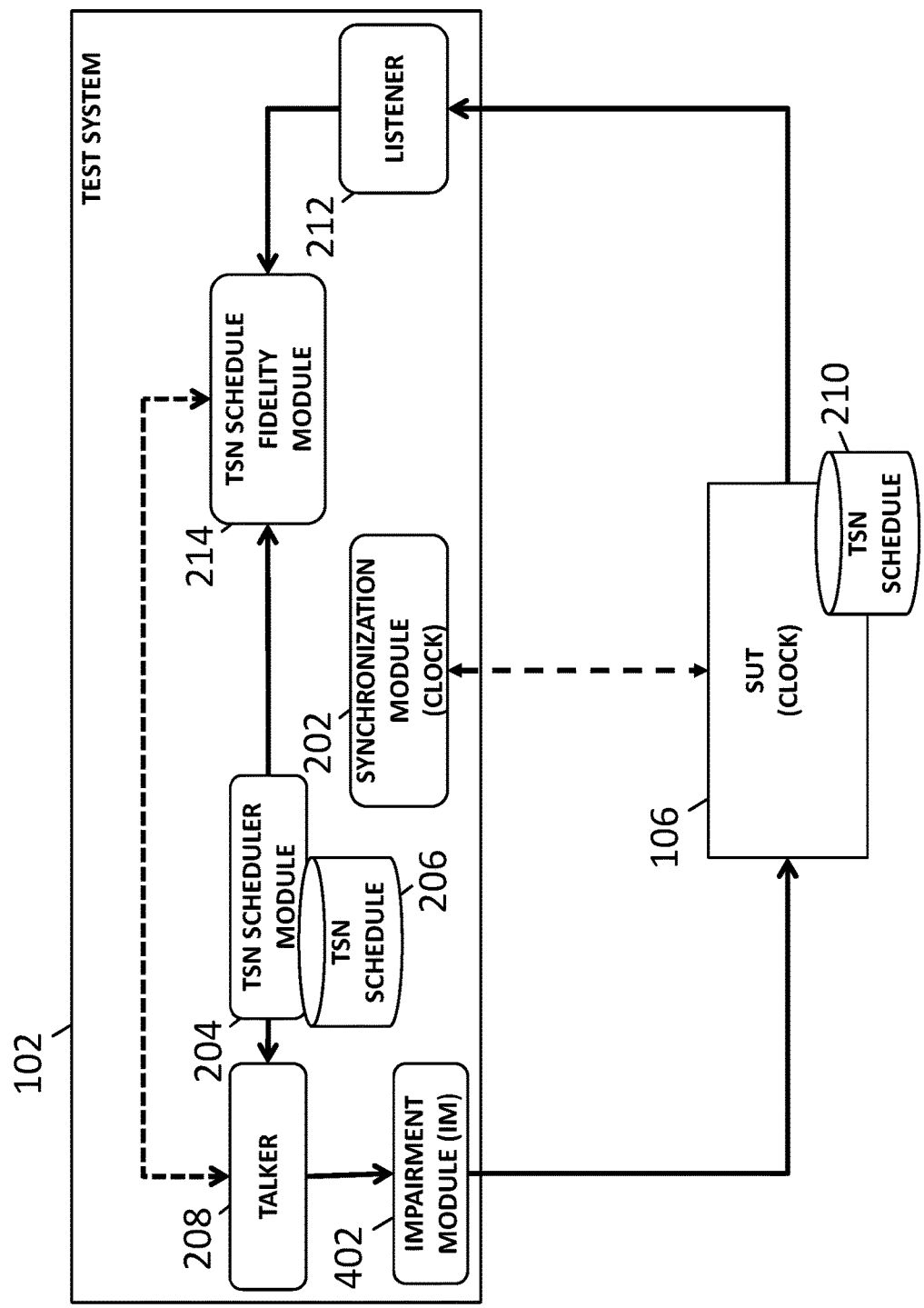
FIG. 4 is a diagram illustrating an example test system that uses an impairment module for impairing transmitted test messages.

FIG. 4 is a diagram illustrating an example test system 102 that uses an impairment module (IM) 402 for impairing transmitted test messages. Unless stated otherwise, test system 102 and related modules or entities depicted in FIG. 4 may include similar functionality as described in regard to FIG. 2.

Referring to FIG. 4, a depicted test environment 400 may involve testing SUT 106 using IM 402. IM 402 may represent any suitable entity (e.g., software executing on at least one processor) for adjusting transmit schedule parameters and/or modifying messages or message content in a test iteration or portion thereof. For example, IM 402 may be capable of changing a message size of a test message, adding fuzzed data to a test message, modifying data in a test message, or changing when or how a test message is transmitted (e.g., triggering a test message to be transmitted before or after a time that is in accordance with TSN schedule 206). In another example, IM 402 may drop messages or may reorder test messages sent to SUT 106.

In some embodiments, synchronization module 202 or a related module in test system 102 may act as a master clock (e.g., a gPTP or PTP grandmaster clock) for time synchronization purposes and SUT 106 may receive time synchronization data from test system 102 so as to synchronize its own clock with the test system clock.

In some embodiments, synchronization module 202 or another module in test system 102 may act as a slave clock (e.g., a gPTP or PTP slave clock) for time synchronization purposes. In such embodiments, test system 102 and SUT 106 may receive time synchronization data from an external master clock (e.g., a gPTP or PTP grandmaster clock).

In some embodiments, IM 402 may include functionality for varying transmit schedule parameters for determining the highest possible rate and/or smallest possible time shaping window that SUT 106 and/or its TAS can handle correctly, e.g., without having to go above an expected receive latency window or a frames loss threshold window. For example, test system 102 and/or one or more related modules may configure a test that uses binary searching for varying transmit schedule parameters so as to determine appropriate test output limit thresholds or windows. In this example, STM user 110 may be able to configure or control all aspects of a TSN scheduler profile. In some embodiments, preset controls for various parameters of a TSN scheduler profile may be utilized in one or more test iterations for determining or deriving TAS accuracy convergence criteria.

In some embodiments, IM 402 may include functionality for modifying message sizes of test packets for testing admission control and/or other functions of SUT 106. For example, test system 102 and/or one or more related modules may configure a test that transmits various sized test messages (e.g., packets that are an expected size and packets that exceed an expected or allowed size) from various message queues or ports to SUT 106. In this example, SUT 106 may be configured with a policy that is to discard "oversized" messages (e.g., any messages larger than a predetermined maximum message size value), while forwarding or relaying all other messages to listener 212. Continuing with this example, to determine whether the policy is accurately implemented at SUT 106, listener 212 and/or another module (e.g., STM 104) may validate that oversize frames are discarded properly in each queue.

It will be appreciated that FIG. 4 is for illustrative purposes and that various nodes and/or modules, locations, and/or functionality described above in relation to FIG. 4 may be changed, altered, added, or removed. Further, while IM 402 is depicted as separate from talker 208, it will be appreciated that IM 402 and/or related functionality may be incorporated with and/or utilize talker 208 or another module in test system 102 when performing various impairment functions described herein.

Figure 5:
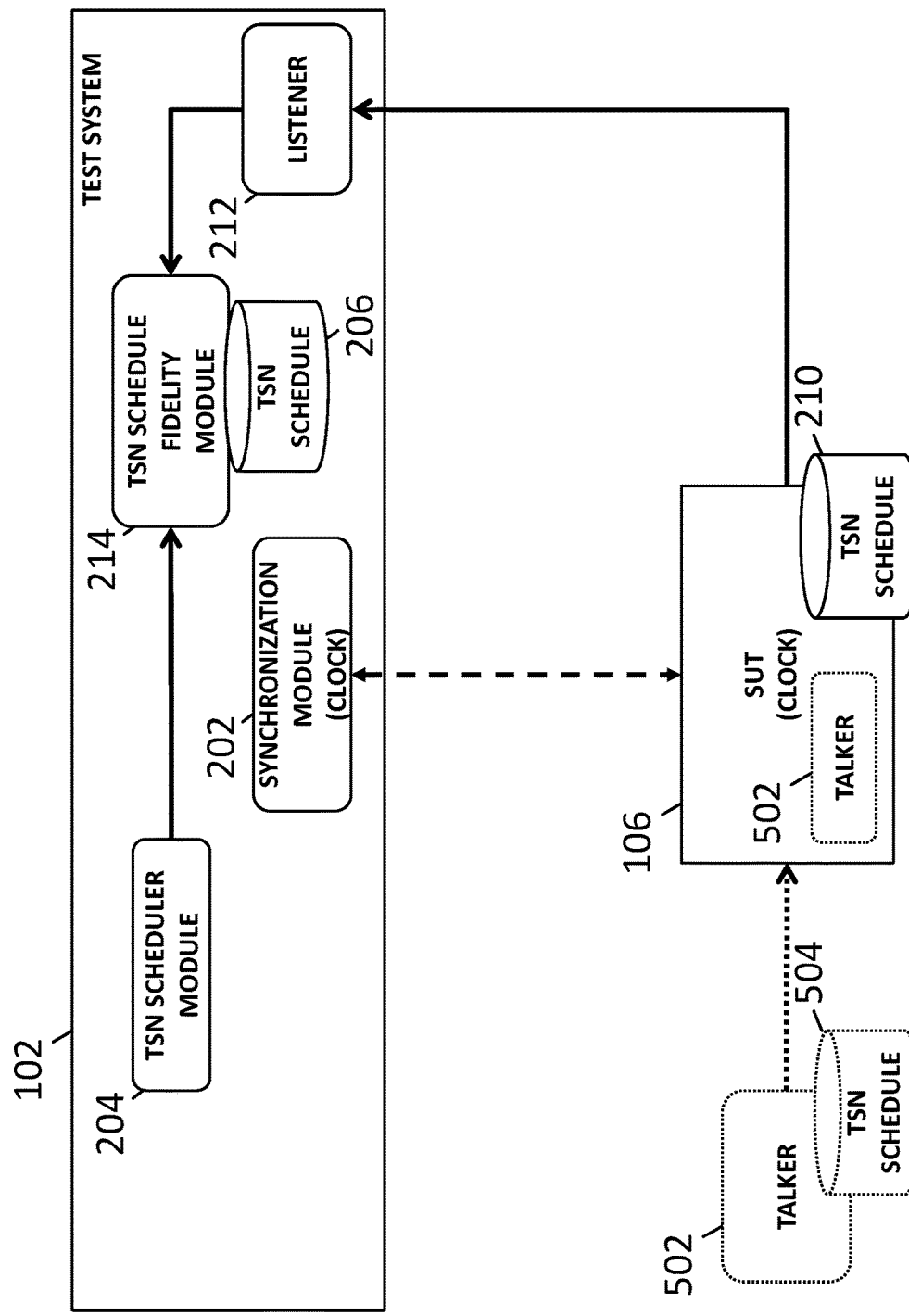
FIG. 5 is a diagram illustrating an example test system and a separate talker device.

FIG. 5 is a diagram illustrating an example test system 102 and a separate talker 502. Unless stated otherwise, test system 102 and related modules or entities depicted in FIG. 5 may include similar functionality as described in regard to FIG. 2.

Referring to FIG. 5, a depicted test environment 500 may involve testing SUT 106 using a separate (e.g., test system independent) talker 502. Talker 502 may represent any suitable entity (e.g., a TSN device) for transmitting messages (e.g., frames or messages) to SUT 106 or other entities and may operate independently of test system 102. For example, talker 502 may be SUT 106 or another entity, such as an actual TSN element in an active (non-test) TSN. In this example, test system 102 may include listener 212 but may forgo sending test messages from an internal or test system associated talker, e.g., talker 208.

In some embodiments, SUT 106 may incorporate or include talker 502 or related functionality. For example, SUT 106, e.g., using talker 502 or related functionality, may generate traffic for a stream using TSN schedule 210. In this example, the traffic may be sent to one or more ports associated with listener 212.

In some embodiments, e.g., where talker 502 is separate from both test system 102 and SUT 106, talker 502 may generate traffic for a stream using TSN schedule 504. In this example, the traffic may be sent to one or more ports associated with SUT 106. Continuing with this example, SUT 106 may process the traffic from talker 502 and send at least some traffic to test system 102 using TSN schedule 210. In some embodiments, synchronization module 202 or a related module in test system 102 may act as a master clock (e.g., a gPTP grandmaster clock) for time synchronization purposes and SUT 106 may receive time synchronization data from test system 102 so as to synchronize its own clock with the test system clock.

In some embodiments, synchronization module 202 or another module in test system 102 may act as a slave clock (e.g., a gPTP slave clock) for time synchronization purposes. In such embodiments, test system 102 and SUT 106 may receive time synchronization data from an external master clock (e.g., a gPTP grandmaster clock).

In some embodiments, TSN schedule fidelity module 214 may use TSN schedule 206 for analyzing received traffic. In some embodiments, expected message stream data and associated expected receive schedule data may be entered and stored per message stream. For example, TSN schedule 206 may include expected message stream data and associated expected receive schedule data (e.g., receive latency variance information for each TSN stream). In this example, TSN schedule 206 and/or related information may be provisioned or determined prior to testing.

In some embodiments, e.g., where a message stream is generated by talker 502 (or other TSN element) that is not directly associated with test system 102, STM user 110 or other user may manually provision TSN schedule 206 and/or TSN schedule fidelity module 214 with expected data. For example, STM user 110 (e.g., a network operator and/or tester) may exert control over talker 502 and/or may know information about a TSN schedule used by talker 502. In this example, STM user 110 may provide expected data to test system 102 and/or modules therein.

In some embodiments, a system, device, or module (e.g., TSN scheduler module) may automatically provision TSN schedule 206 and/or TSN schedule fidelity module 214 with expected data. For example, a system may determine, derive, or identify a TSN schedule based on observation, querying a node or database (e.g., via an API), a test specification, or other techniques. In some embodiments, listener 212 may be configured for identifying message streams received from one or more ports so as to identify and/or associate received messages with expected message data on a per-stream basis. For example, listener 212 may identify or obtain information on one or more message parameters (e.g., source media access control (MAC) address and destination MAC address) to use as stream identifiers, which may be used for uniquely identifying particular message streams. In this example, listener 212 may use stream identifiers so as to correlate the data of received message with expected message stream data and associated expected receive schedule data, including, for example, expected receive schedule variance/window information, on a per message stream basis.

In some embodiments, TSN schedule fidelity module 214 may determine how faithfully or accurately SUT 106 has implemented TSN schedule 210. For example, TSN schedule fidelity module 214 may analyze each message stream using timing information of received messages and expected timing information to determine various statistics related to the performance of SUT 106.

In some embodiments, statistics and/or other test related data may be presented to STM user 110. For example, listener 212 or ports therein may be configured to operate in an egress tracking only mode. In this example, in egress tracking only mode, listener 212 or ports therein may be capable of counting messages received per stream by identifying related messages by reading specific message fields (e.g., parameter values) and/or specific offsets in the messages. Continuing with this example, in egress tracking only mode, listener 212 or ports therein may or may not use or read a test system based signature in the messages received.

In some embodiments, TSN schedule fidelity related statistics may be computed and/or presented. For example, test system 102 or TSN schedule fidelity module 214 may utilize expected test message data and actual timestamps of messages to identify time delta (e.g., the difference between when a message is expected to arrive and when it actually arrived) for test messages in one or more message streams. In this example, time delta may be shown or depicted as a line or bar graph, e.g., where an x-axis indicates a number of messages and a y-axis indicates an amount of time (e.g., nanoseconds).

In some embodiments, TSN schedule fidelity related statistics may be determined using packet capture and related derived information. For example, STM user 110 may manually inspect receive times of messages. In another example, STM user 110 may select a message statistics view, where the message statistics view may display various message statistics using data obtained via packet capture analysis in real time or offline capture mode.

It will be appreciated that FIG. 5 is for illustrative purposes and that various nodes and/or modules, locations, and/or functionality described above in relation to FIG. 5 may be changed, altered, added, or removed.

Figure 6:
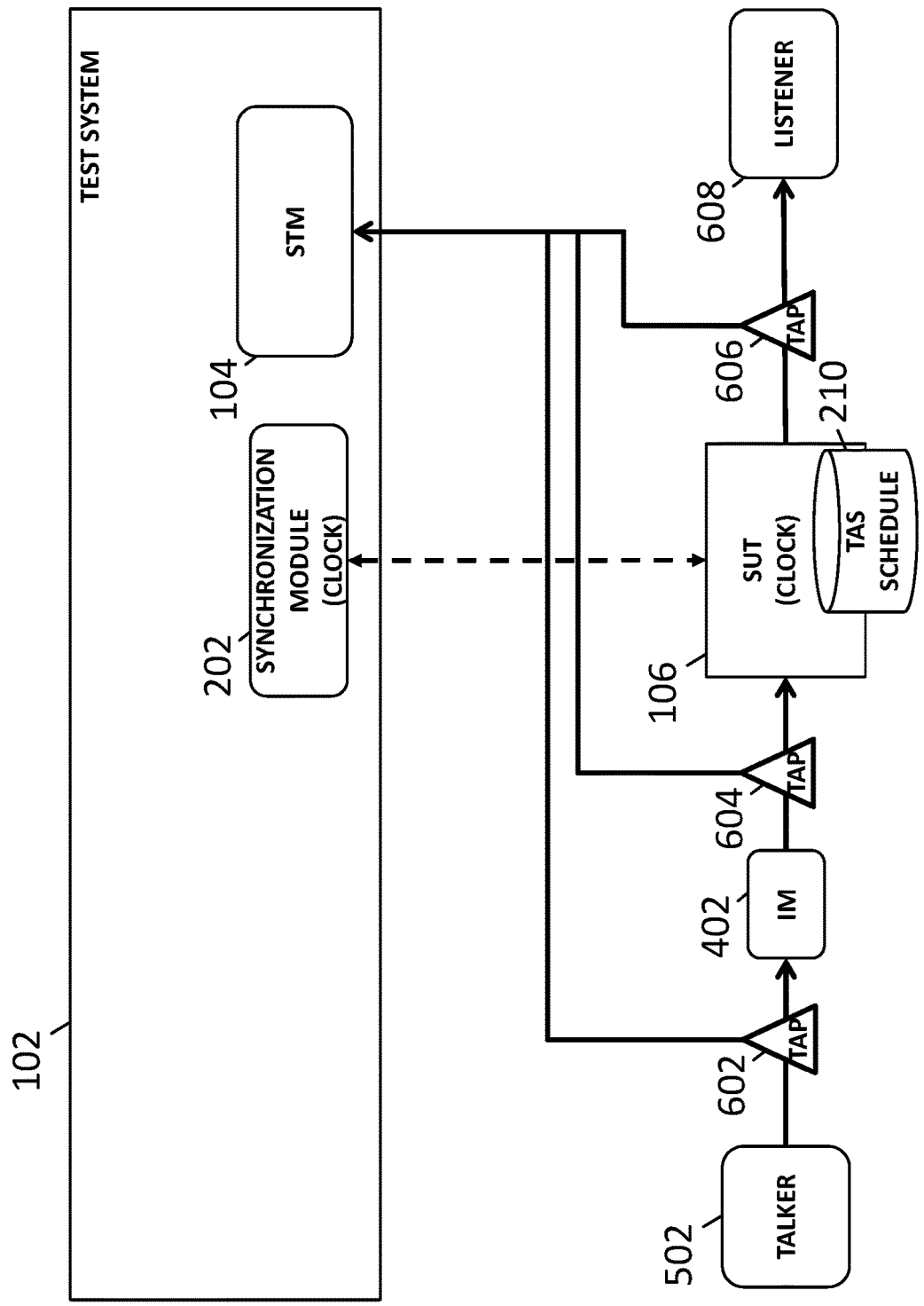
FIG. 6 is a diagram illustrating an example test system that uses network taps to perform testing.

FIG. 6 is a diagram illustrating an example test system 102 that uses network taps 602-606 to perform testing. Unless stated otherwise, test system 102 STM 104, and SUT 106 depicted in FIG. 6 may include similar functionality as described in regard to FIG. 1, synchronization module 202 and IM 402 depicted in FIG. 6 may include similar functionality as described in regard to FIG. 4, and talker 502 depicted in FIG. 6 may include similar functionality as described in regard to FIG. 5.

Referring to FIG. 6, a depicted test environment 600 may involve testing SUT 106 by utilizing network taps 602-606 to obtain and analyze traffic between a separate or independent talker 502 and a separate or independent listener 608. Network taps 602-606 may represent any suitable entities for copying messages or related data that traverses one or more links and for sending the messages or related data to one or more destinations, such as STM 104.

Talker 502 may represent any suitable entity (e.g., a TSN device) for transmitting messages (e.g., frames or packets) to SUT 106 or other entities and may operate independently of test system 102. For example, talker 502 may be an actual TSN element in an active (non-test) TSN. Listener 608 may represent any suitable entity (e.g., a TSN device) for receiving messages (e.g., frames or messages) from SUT 106 or other entities and may operate independently of test system 102. For example, listener 608 may be an actual TSN element in an active (non-test) TSN.

In some embodiments, synchronization module 202 or a related module in test system 102 may act as a master clock (e.g., a gPTP grandmaster clock) for time synchronization purposes and SUT 106 may receive time synchronization data from test system 102 so as to synchronize its own clock with the test system clock.

In some embodiments, synchronization module 202 or another module in test system 102 may act as a slave clock (e.g., a gPTP slave clock) for time synchronization purposes. In such embodiments, test system 102 and SUT 106 may receive time synchronization data from an external master clock (e.g., a gPTP grandmaster clock).

In some embodiments, test environment 600 may be usable for TSN deployment testing, e.g., debugging a TSN scheduler or other nodes or issues in an active (non-test) environment. For example, using the setup depicted in FIG. 6, test system 102 and/or STM 104 may analyze and/or identify various issues by observing traffic including injected and/or impaired traffic from IM 402 or other entities. In this example, test system 102 and/or STM 104 may use timing information (e.g., timestamps) from observed traffic and other information (e.g., expected receive times based on a known TSN schedule 206) to determine scheduling errors or other issues.

Some example test objectives for test environment 600 may include analyzing if SUT 106 (e.g., a message relay) is properly forwarding TSN packets based on a configured network schedule, analyzing robustness of TSN prioritization by generating interfering or additional traffic (e.g., using IM 402) between talker 502 and listener 608, analyzing robustness of TSN prioritization by generating interfering traffic through SUT 106 or various relays, analyzing how or if impairment of TSN packets (e.g., delay, burst, reorder, drop, corrupt) affects SUT 106, and analyzing how or if impairment of TSN packets (e.g., delay, burst, reorder, drop, corrupt) is affects listener 608.

It will be appreciated that FIG. 6 is for illustrative purposes and that various nodes and/or modules, locations, and/or functionality described above in relation to FIG. 6 may be changed, altered, added, or removed.

Figure 7:
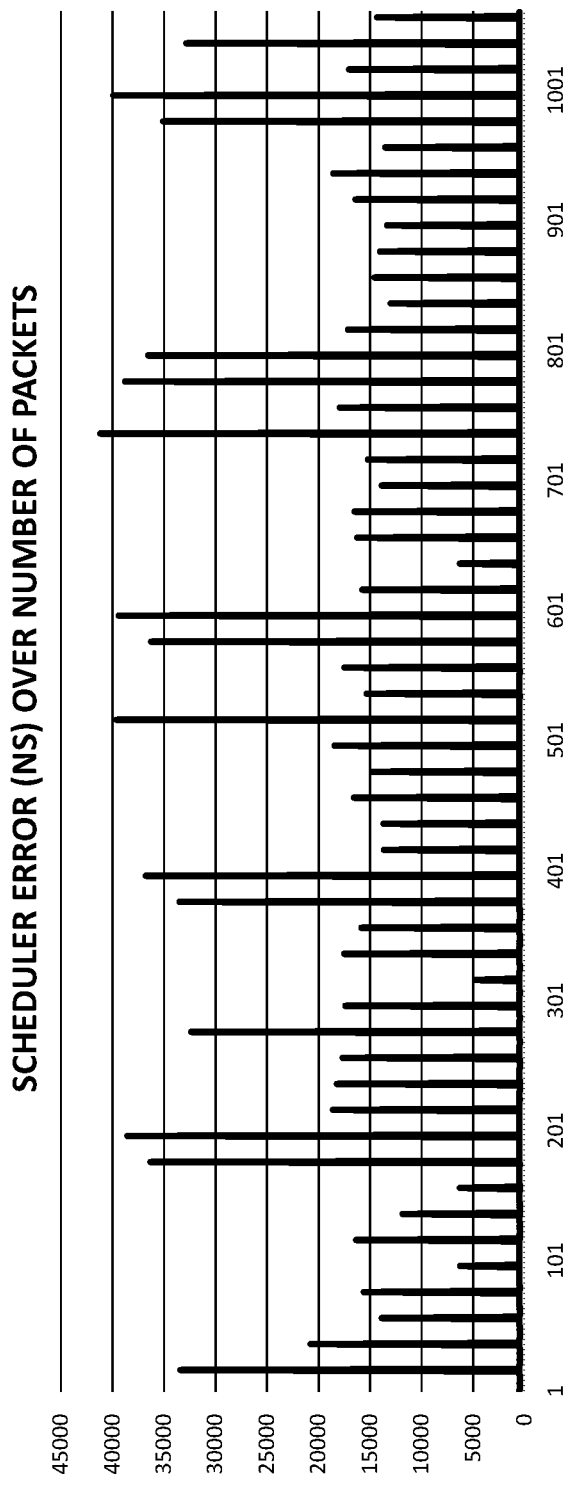
FIG. 7 is a diagram illustrating scheduler errors after testing a TSN element.

FIG. 7 is a diagram illustrating scheduler errors after testing a TSN element. In some embodiments, test system 102, STM 104, or another module (TSN schedule fidelity module 214) may include functionality for generating and displaying TSN scheduler related errors using a histogram 700 or other graphical data representation. For example, as depicted in FIG. 7, histogram 700 may indicate a significant spike in TSN scheduler related errors for every 100 packets transmitted.

In some embodiments, test system 102, STM 104, or another module (TSN schedule fidelity module 214) may include functionality for displaying or presenting various statistics, preferences, and/or display settings to STM user 110. For example, test system 102 or STM 104 may allow STM user 110 to configure or alter attributes related to histogram 700 including x- and y-coordinates and related scaling.

It will be appreciated that FIG. 7 is for illustrative purposes and that different and/or additional data and/or display techniques may be used for displaying histogram 700 or data therein.

Figure 8:
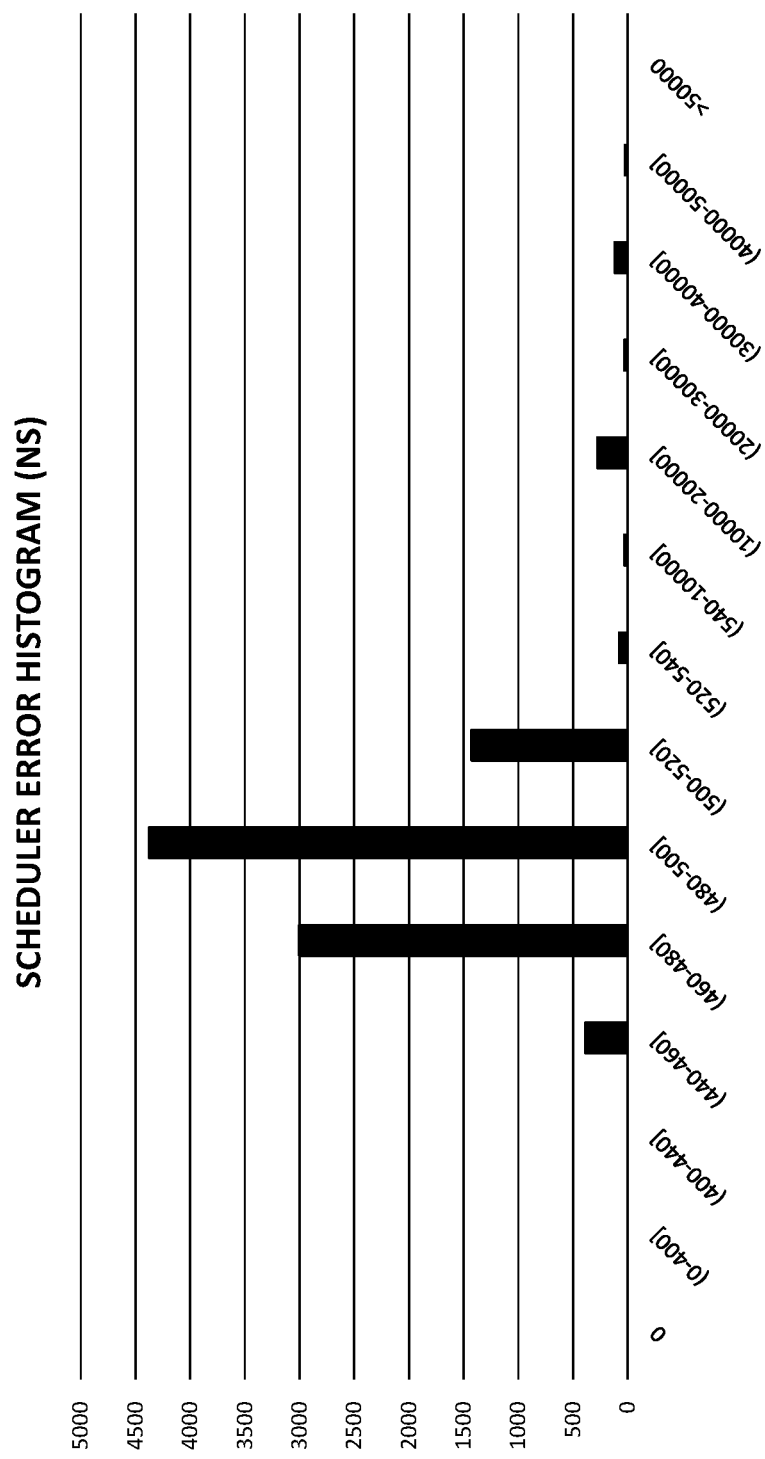
FIG. 8 is a diagram illustrating latency histogram reporting results after testing a TSN element.

FIG. 8 is a diagram illustrating latency bin reporting results 800 after testing a TSN element. In some embodiments, test system 102, STM 104, or another module (e.g., TSN schedule fidelity module 214) may include functionality for categorizing test traffic into latency bins. Each latency bin may represent a length of time (e.g., microseconds) associated with corresponding measured or derived TSN scheduler related errors. For example, as depicted in FIG. 8, results 800 may indicate a significant number of errors causing between 480 and 500 microseconds of latency.

In some embodiments, test system 102, STM 104, or another module (TSN schedule fidelity module 214) may include functionality for displaying or presenting various statistics, preferences, and/or display settings to STM user 110. For example, test system 102 or STM 104 may allow STM user 110 to configure or alter a categorization algorithm when selecting latency bins usable for depicting results 800.

It will be appreciated that FIG. 8 is for illustrative purposes and that different and/or additional data and/or display techniques may be used for displaying results 800.

Figure 9:
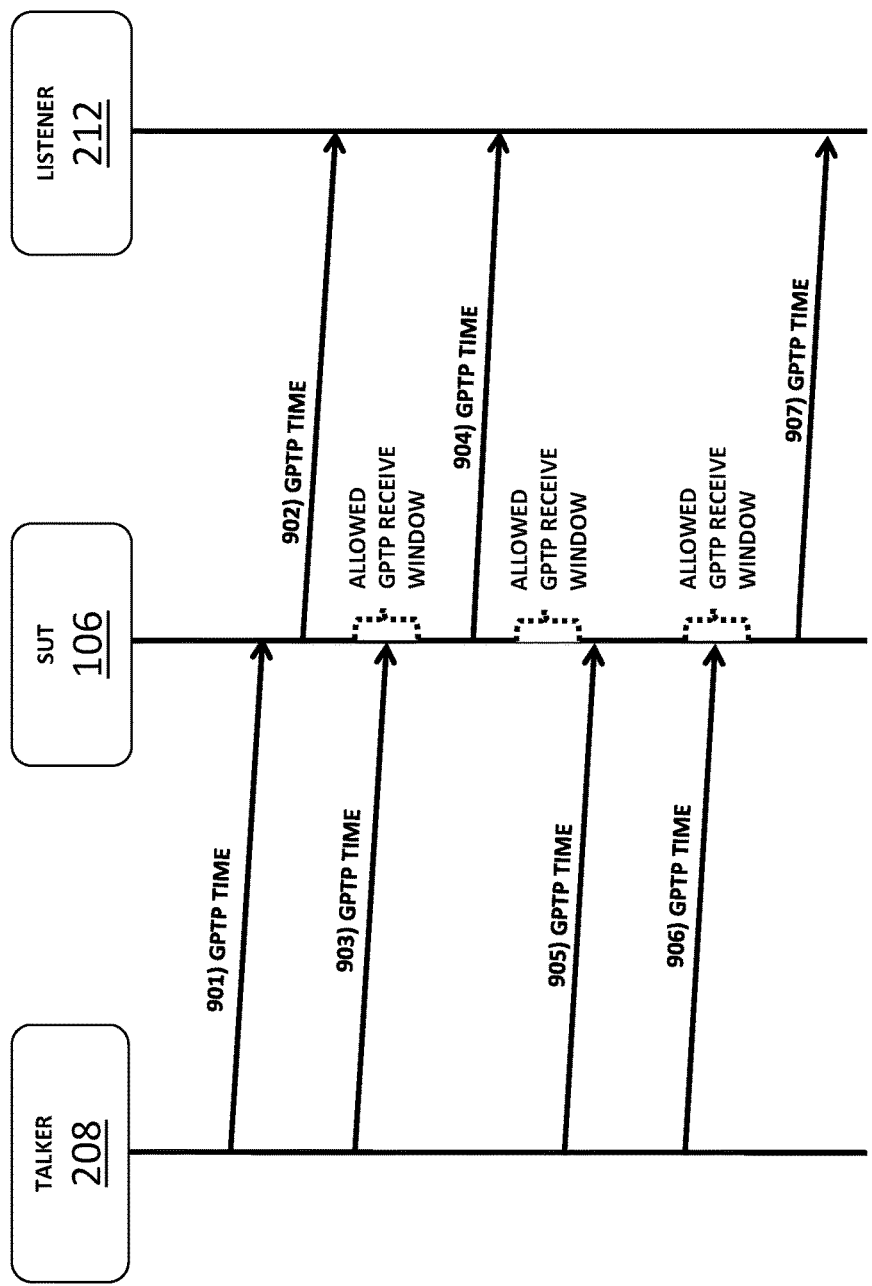
FIG. 9 is a message diagram illustrating testing a messaging policy of a TSN element.

FIG. 9 is a message diagram illustrating testing a messaging policy of a TSN element. Referring to FIG. 9, a test environment 900 may include talker 208 for sending or transmitting test messages to SUT 106 and listener 212 for receiving test messages from SUT 106. Test environment 900 may be usable for testing a messaging policy (e.g., Qci policing) associated with SUT 106, where SUT 106 may include gPTP relay functionality. For example, test environment 900 may be usable for testing whether a messaging policy is properly implemented (e.g., performing as expected) at SUT 106. In this example, the tested messaging policy may involve dropping gPTP messages that are received outside of an allowed receive window and forwarding or relaying, to listener 212, gPTP messages that are received within the allowed receive window.

In some embodiments, talker 208 or a related module in test system 102 may act as a master clock (e.g., a gPTP grandmaster clock) for time synchronization purposes and SUT 106 may receive time synchronization data from talker 208 for synchronizing the SUT's own clock.

Referring to FIG. 9, in step 901, a first gPTP message may be sent from talker 208 to SUT 106 and may be received outside an allowed gPTP receive window.

In step 902, the first gPTP message may be sent from SUT 106 to listener 212. Since the first gPTP message was sent to SUT 106 even though it was received outside an allowed gPTP receive window, test system 102 or a related module may determine that the tested messaging policy at SUT 106 is not appropriately implemented or configured.

In block 903, a second gPTP message may be sent from talker 208 to SUT 106 and may be received within an allowed gPTP receive window.

In step 904, the second gPTP message may be sent from SUT 106 to listener 212 in accordance with the tested messaging policy.

In block 905, a third gPTP message may be sent from talker 208 to SUT 106 and may be received outside an allowed gPTP receive window. The third gPTP message may be discarded in accordance with the tested messaging policy.

In block 906, a fourth gPTP message may be sent from talker 208 to SUT 106 and may be received within an allowed gPTP receive window.

In step 907, the fourth gPTP message may be sent from SUT 106 to listener 212 in accordance with the tested messaging policy.

In some embodiments, test system 102, STM 104, or another module may analyze, derive, and/or determine performance information about SUT 106 and/or functionality thereof. For example, test system 102 may determine, e.g., using results depicted in FIG. 9, that the implementation of the tested messaging policy fails when gPTP messages are received outside of an allowed receive window by more than 5 seconds but that the implementation of the tested messaging policy performs as expected when gPTP messages are received within an allowed receive window or received outside an allowed receive window by 5 seconds or less.

It will be appreciated that FIG. 9 is for illustrative purposes and that different and/or additional messages and/or actions may be used for testing SUT 106 and/or related actions. It will also be appreciated that various messages and/or actions described herein with regard to FIG. 9 may occur in a different order or sequence. Further, it will be appreciated that various other aspects of SUT functionality and/or configuration can be tested using test system 102 and/or functionality described herein.

Figure 10:
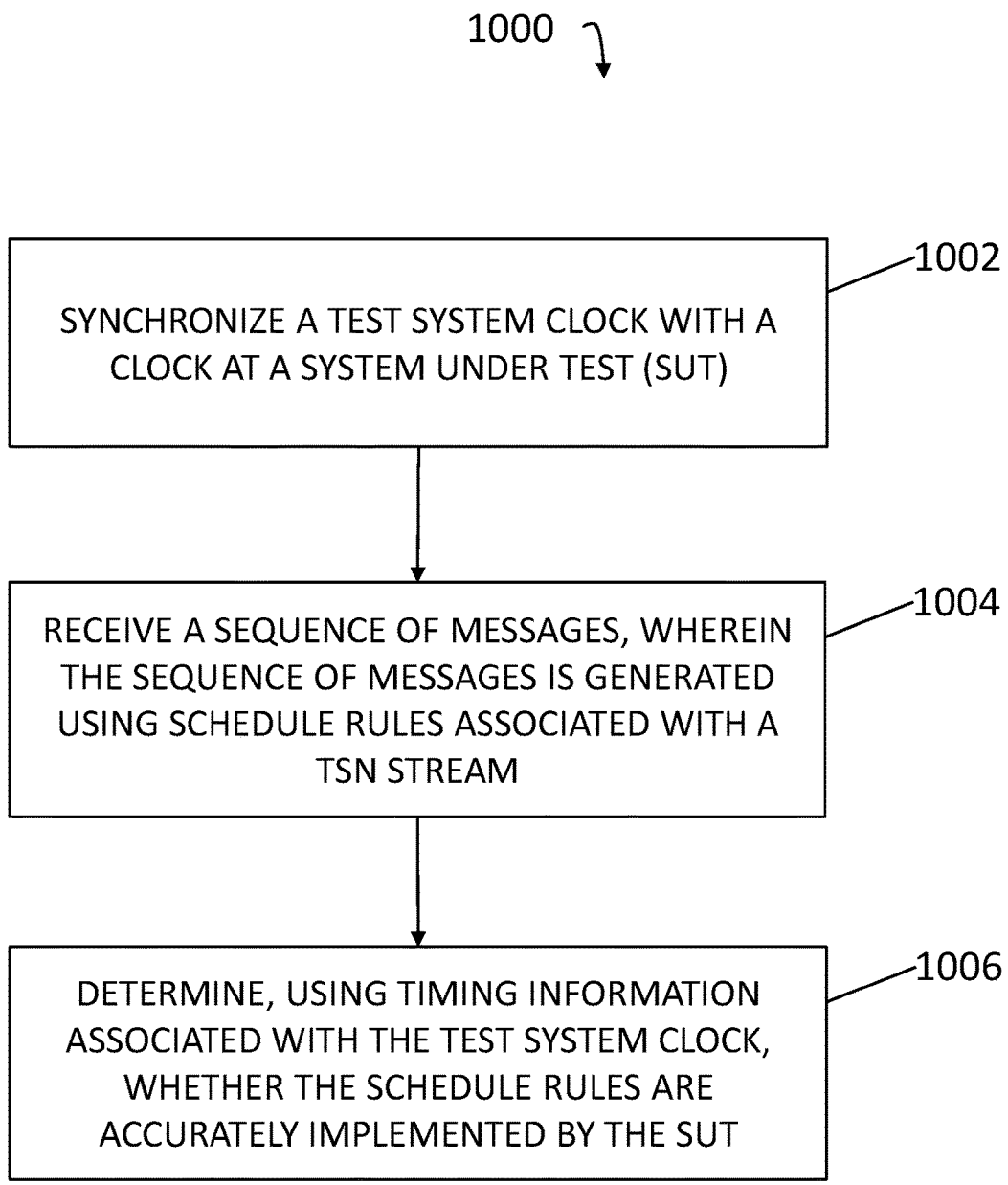
FIG. 10 is a block diagram illustrating an example process for testing a TSN element.

FIG. 10 is a block diagram illustrating an example process 1000 for testing a TSN element. In some embodiments, process 1000, or portions thereof, may be performed by test system 102, STM 104, SUT 106 and/or another node or module. In some embodiments, example process 1000 may include blocks 1002, 1004, and/or 1006.

Referring to example process 1000, in block 1002, a test system clock may be synchronized with a clock at SUT 106. For example, STM 104 or synchronization module 202 may include, utilize, or communicate with a test system clock. In this example, the test system clock and a clock at SUT 106 may be synchronized using gPTP or another time synchronization protocol. In another example, SUT 106 & test system 102 may use external time inputs from a GPS-based time source.

In some embodiments, the test system clock may be configured for acting as a master clock or a slave clock for synchronizing the test system clock with the clock at SUT 106. For example, the test system clock may act as a PTP grandmaster clock and may provide time synchronization data to SUT 106. In another example, the test system clock may act as a slave clock and may receive time synchronization data from a PTP grandmaster clock.

In block 1004, a sequence of messages may be received. The sequence of messages may be generated using schedule rules associated with a TSN stream. For example, schedule rules at SUT 106 (e.g., TSN schedule 210) may be similar to or the same as schedule rules at test system 102 (e.g., TSN schedule 206) or other related entities. In this example, schedule rules may be provided to SUT 106 by test system 102, STM 104, or a related module prior to testing of SUT 106.

In some embodiments, a sequence of messages that is received at test system 102 may be sent by SUT 106, test system 102, or a talker device (e.g., talker 502) separate from SUT 106 and the test system 102.

In some embodiments, e.g., at test system 102 and prior to a sequence of messages being received from SUT 106, a sequence of test messages may be generated and transmitted to SUT 106 using TSN schedule 206.

In some embodiments, generating test messages may include embedding high precision timestamp and/or expected received packet latency in each test message (e.g., packet). For example, by embedding such information, test system 102 may be able to quickly generate various statistics and/or other timing related measurements.

In some embodiments, e.g., at test system 102 and prior to a sequence of messages being received from SUT 106, a TSN schedule for a message stream associated with the testing of the SUT may be determined, selected, or implemented.

In some embodiments, test system 102 may be configured for provisioning SUT 106 with schedule rules, wherein the schedule rules may be associated with a TSN schedule.

In some embodiments, transmitting test messages to SUT 106 may include scheduling the transmission of every test message or scheduling the transmission of a first test message and using stream delay information and a message rate for transmitting subsequent test messages. For example, STM 104 or TSN scheduler module 204 may generate a transmit message schedule containing a list of messages to transmit and a time to transmit each message. In this example, the transmit message schedule may be used to transmit each of the messages at the scheduled time. In another example, STM 104 or TSN scheduler module 204 may generate a transmit message schedule containing a list of messages to transmit and a time to transmit the first message. In this example, the transmit message schedule may be used along with stream delay information, cycle time parameter information, and/or an expected message rate to transmit the first message and subsequent messages.

In some embodiments, transmitting a sequence of test messages to SUT 106 may include sending at least one impaired test message, wherein the at least one impaired test message has a different message size than expected, fuzzed data, is sent in a different order than expected, or may be sent outside an acceptable time period based on one or more schedule rules. For example, IM 402 may adjust test message attributes and/or transmission related parameters associated with TSN schedule 206 when sending test messages to SUT 106.

In block 1006, it may be determined, using timing information associated with the test system clock, whether the schedule rules are accurately implemented by SUT 106. In some embodiments, determining whether schedule rules are accurately implemented by SUT 106 may include using latency and inter-packet arrival time measurements based on message data (e.g., high precision timestamps and/or expected received packet latency embedded in test messages) and scheduling information about a relevant message stream.

In some embodiments, test system 102 may be configured for testing one or more functions performed by SUT 106 or one or more TSN standards or protocols implemented by SUT 106. For example, test system 102 may be configured for testing redundancy in a time synchronization protocol profile gateway, testing timing in a time synchronization protocol profile gateway, testing a reservation protocol flow, testing reservation protocol scalability of a control plane, testing a talker, analyzing bandwidth guarantees, analyzing latency, analyzing a scheduler related to testing a talker, testing a relay, analyzing a scheduler related to testing a relay, testing a hot-standby grandmaster or master clock, testing a non-TSN element to an TSN gateway, testing frame replication and elimination, testing seamless redundancy for switches and endpoints, testing gate accuracy, testing TSN schedule fidelity, testing admission control of a TSN element, testing discard policy for improperly sized messages, testing interactions with a credit based shaper or other shaper (e.g., non-TAS), testing live configuration changes in a TAS, and/or testing configuration updates.

It will be appreciated that process 1000 is for illustrative purposes and that different and/or additional actions may be used. It will also be appreciated that various actions described herein may occur in a different order or sequence.

It should be noted that test system 102, STM 104, and/or various modules or functionality described herein may constitute a special purpose computing platform, device, or system. For example, test system 102 may be an IxNetwork™ test appliance manufactured by Ixia and configured to perform various aspects described herein. Further, test system 102, STM 104, and/or various modules or functionality described herein can improve the technological field of network testing by providing a tenable solution for testing TSN elements.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a time sensitive network (TSN) element, the method comprising:
   at a test system:
   synchronizing a test system clock with a clock at a system under test (SUT);
   generating a sequence of test messages using schedule rules associated with a TSN stream;
   transmitting the sequence of test messages to the SUT;
   receiving the sequence of test messages; and
   determining, using timing information associated with the test system clock, whether the schedule rules are accurately implemented by the SUT.

2. The method of claim 1 wherein a second sequence of messages is sent by the SUT, the test system, or a talker device separate from the SUT and the test system.

3. The method of claim 1 wherein transmitting the sequence of test messages to the SUT includes sending at least one impaired test message, wherein the at least one impaired test message has a different message size than expected, fuzzed data, is sent in a different order than expected, or is sent outside an acceptable time period based on the schedule rules.

4. The method of claim 1 wherein transmitting the sequence of test messages to the SUT includes:
scheduling the transmission of every message in the sequence of test messages; or
scheduling the transmission of a first message in the sequence of test messages and using stream delay information and a message rate for transmitting subsequent test messages.

5. The method of claim 1 comprising:
at the test system and prior to generating the sequence of test messages:
determining a TSN schedule for the TSN stream associated with the testing of the SUT.

6. The method of claim 1 comprising:
at the test system:
provisioning the SUT with the schedule rules associated with the TSN stream.

7. The method of claim 1 wherein determining whether the schedule rules are accurately implemented by the SUT includes using latency and inter-packet arrival time measurements based on message timestamps and scheduling information about the TSN stream.

8. The method of claim 1 wherein the test system clock is configured for acting as a master clock or a slave clock for synchronizing the test system clock with the clock at the SUT.

9. The method of claim 1 wherein the test system is configured for testing one or more functions performed by the SUT or one or more TSN standards or protocols implemented by the SUT.

10. A system for testing a time sensitive network (TSN) element, the test system comprising:
at least one processor;
wherein the test system configured for:
synchronizing a test system clock with a clock at a system under test (SUT);
generating a sequence of test messages using schedule rules associated with a TSN stream;
transmitting the sequence of test messages to the SUT;
receiving the sequence of test messages; and
determining, using timing information associated with the test system clock, whether the schedule rules are accurately implemented by the SUT.

11. The system of claim 10 wherein a second sequence of messages is sent by the SUT, the test system, or a talker device separate from the SUT and the test system.

12. The system of claim 10 wherein the test system is configured for sending at least one impaired test message, wherein the at least one impaired test message has a different message size than expected, fuzzed data, is sent in a different order than expected, or is sent outside an acceptable time period based on the schedule rules.

13. The system of claim 10 wherein the test system is configured for:
scheduling the transmission of every message in the sequence of test messages; or
scheduling the transmission of a first message in the sequence of test messages and using stream delay information and a message rate for transmitting subsequent test messages.

14. The system of claim 10 wherein the test system is configured for:
prior to generating the sequence of test messages:
determining a TSN schedule associated with the TSN stream associated with the testing of the SUT.

15. The system of claim 10 wherein the test system is configured for provisioning the SUT with the schedule rules associated with the TSN stream.

16. The system of claim 10 wherein the test system is configured for determining whether the schedule rules are accurately implemented by the SUT by using latency and inter-packet arrival time measurements based on message timestamps and scheduling information about the TSN stream.

17. The system of claim 10 wherein the test system clock is configured for acting as a master clock or a slave clock for synchronizing the test system clock with the clock at the SUT.

18. The system of claim 10 wherein the test system is configured for testing one or more functions performed by the SUT or one or more TSN standards or protocols implemented by the SUT.

19. A non-transitory computer readable medium comprising computer executable instructions embodied in the non-transitory computer readable medium that when executed by at least one processor of a computer cause the computer to perform steps comprising:
at a test system:
synchronizing a test system clock with a clock at a system under test (SUT);
generating a sequence of test messages using schedule rules associated with a TSN stream;
transmitting the sequence of test messages to the SUT;
receiving the sequence of test messages; and
determining, using timing information associated with the test system clock, whether the schedule rules are accurately implemented by the SUT.

* * * * *